United States Patent [19]

Bauman

[11] 4,359,560

[45] Nov. 16, 1982

[54] METHOD FOR REDUCING WALL FOULING IN VINYL CHLORIDE POLYMERIZATION

[75] Inventor: Bernard D. Bauman, Plymouth Meeting, Pa.

[73] Assignee: Air Products and Chemicals, Inc., Allentown, Pa.

[21] Appl. No.: 915,090

[22] Filed: Jun. 13, 1978

[51] Int. Cl.³ .................................................. C08F 2/18
[52] U.S. Cl. ........................................ 526/74; 526/62
[58] Field of Search ..................................... 526/74, 62

[56] References Cited

U.S. PATENT DOCUMENTS

| | | | |
|---|---|---|---|
| 3,488,328 | 1/1970 | Koyanagi et al. | 526/74 |
| 3,562,238 | 2/1971 | Parks | 526/62 |
| 3,669,946 | 6/1972 | Koyanagi et al. | 526/62 |
| 3,778,423 | 12/1973 | Reiter | 526/62 |
| 3,842,055 | 10/1974 | Gabriel et al. | 526/62 |
| 3,926,910 | 12/1975 | Mowdood | 526/62 |
| 3,997,707 | 12/1976 | Aruga et al. | 526/62 |
| 4,024,301 | 5/1977 | Witehafer et al. | 526/62 |
| 4,068,052 | 1/1978 | Weimer et al. | 526/62 |

FOREIGN PATENT DOCUMENTS

| | | |
|---|---|---|
| 2224144 | 11/1973 | Fed. Rep. of Germany ........ 526/74 |
| 1365590 | 9/1974 | United Kingdom . |
| 1536160 | 12/1978 | United Kingdom . |

*Primary Examiner*—Paul R. Michl
*Attorney, Agent, or Firm*—E. Eugene Innis; Russell L. Brewer

[57] ABSTRACT

This invention relates to an improvement for reducing the amount of wall fouling in the suspension polymerization of vinyl chloride. The improvement resides in wetting the reactor surface with a solution containing from 5 to 50 parts by weight of an alkali metal hydroxide prior to charging the vinyl chloride recipe to the reactor. Preferably, the surface of the resulting reactor is heated at a temperature of from 40°–100° C. prior to charging the recipe.

5 Claims, No Drawings

METHOD FOR REDUCING WALL FOULING IN VINYL CHLORIDE POLYMERIZATION

BACKGROUND OF THE INVENTION

1. Field of the Invention

This invention relates to a method for reducing the wall fouling normally occurring in stainless steel reactors used for the suspension polymerization of vinyl chloride containing monomer systems.

2. Description of the Prior Art

Wall fouling in reactors used for the suspension polymerization of vinyl chloride systems has been a problem, and particularly so in recent years because of the tight constraints imposed on vinyl chloride emission to the atmosphere. Several obvious advantages would be achieved by reducing wall fouling. First, productivity of the reactors could be increased in that the reactors would not have to be taken out of service as often for cleaning. Second, there is less product contamination due to particulate material dropping from the reactor surface into the product.

Some of the techniques used in reducing polymer deposit in the polymerization of vinyl chloride are described in the following patents:

U.S. Pat. No. 3,778,423 discloses a process for reducing polymer deposit in a glass lined reactor by wetting the reactor surface with a solution containing a free radical inhibitor, e.g., a polar organic compound such as alpha-methyl styrene or a chain terminating agent such as an amine, e.g., ethylenediamine tetraacetic acid; fatty acids, an aldehyde such as acrolein, methacrolein and a conjugated diolefin such as isoprene or butadiene.

U.S. Pat. No. 3,562,238 discloses a process for reducing reactor wall fouling in vinyl chloride polymerization by incorporating less than 1,000 ppm (based on the monomers) of magnesium hydroxide in the polymer recipe.

U.S. Pat. No. 3,926,910 discloses a method for reducing reactor wall fouling in vinyl chloride polymerization processes by incorporating from about 0.001 to about 0.02 parts of a nitrite salt per 100 parts monomer onto the reactor surface prior to forming resinous material. The nitrite can be included in the polymerization recipe or sprayed onto the reactor surface as an aqueous solution.

U.S. Pat. No. 3,842,055 discloses a process for reducing reactor wall fouling in the suspension polymerization of vinyl chloride by spraying a fine stream of water in an amount of 20-100% volume of the volume of monomers onto the reactor dome during polymerization.

U.S. Pat. No. 3,669,946 discloses a method for preventing polymer deposition on reactor walls and equipment by coating the surfaces with a polar organic compound such as benzene or ethanol. Example 1 shows applying the solvent to the reactor surfaces and then drying the solvent therefrom. Example 7 in the patent shows that small additions of a caustic soda solution, e.g., in the amount of 0.1% based on vinyl chloride content, give some improvement in reducing polymer deposition.

U.S. Pat. No. 4,024,301 discloses the addition of a branched polymerization amine such as o-phenylene diamine as a coating for the reactor surface.

U.S. Pat. No. 3,997,707 discloses the addition of oxalic acid or its salt to the polymerization recipe in an effort to reduce wall fouling.

SUMMARY OF THE INVENTION

This invention relates to an improved process for reducing reactor wall fouling in the suspension polymerization of a recipe comprising water, vinyl chloride or a mixture of vinyl chloride and other vinyl monomers copolymerizable therewith, a suspension agent, and free radical initiator. The improvement for reducing wall fouling in stainless steel reactors comprises wetting the internal reactor surfaces, including turbine blades and shafts, baffles, and cooling coils with a solution comprising from about 3–50 parts by weight of an alkali metal hydroxide prior to charging the recipe to the reactor. In a preferred embodiment, the reactor surface is contacted with the alkali metal hydroxide solution and the reactor surface is heated to a temperature of from about 40°–100° C. for at least 5 minutes prior to charging the recipe.

Although many of the above prior art systems reduced wall fouling, the treatment methods are often difficult to perform and the treating compositions quite expensive. In many instances the results, even though the methods were utilized, were marginal.

Several advantages can be achieved by this process, and they include:

a solution, which is relatively inexpensive compared to many prior art systems;

a treatment method which is capable of reducing vinyl chloride polymer deposition in stainless steel reactors to a level at least, if not better, than many of the reported commercially used processes;

a mechanism for reducing polymer deposition utilizing a solution which is relatively noncorrosive to commercial equipment and in addition, relatively easy to handle.

DESCRIPTION OF THE PREFERRED EMBODIMENTS

The present invention is based on the discovery that a concentrated solution of an alkali metal hydroxide when applied to the internal surface of a stainless steel reactor can effectively reduce the amount of polymer deposition normally associated with the suspension polymerization of vinyl chloride. Representative alkali metal hydroxides which are effective are the Group I metals and include sodium hydroxide, potassium hydroxide, lithium hydroxide, and the like. Although quite often ammonium hydroxide is viewed as an alkali metal hydroxide or at least equivalent thereto, ammonium hydroxide is not intended to be included within this definition of alkali metal hydroxide. As the examples show inferior results, in terms of wall fouling, are noted with ammonium hydroxide.

The alkali metal hydroxide is included in the treating solution in a concentrated amount of from about 3–50% by weight, and preferably between about 10–25%. The latter range is particularly effective for sodium and potassium hydroxide. It has been found that when the concentration of alkali metal hydroxide is reduced generally below about 3% by weight, there often is insufficient caustic or alkali metal hydroxide deposited on the internal reactor surfaces to substantially inhibit polymer deposition on the reactor surface. On the other hand, as the proportion of alkali metal hydroxide exceeds about 50% by weight, the advantages are not commensurate with the additional cost associated with the higher concentration alkali metal hydroxide. Further, it becomes difficult to handle the solution under plant conditions. For reasons of economy and efficiency, and based on the results obtained, it appears that a proportion of about 10-25% by weight of alkali metal hydroxide, preferably sodium hydroxide, should be used to coat or wet the internal surfaces of the reactor.

Any solvent in which the alkali metal hydroxide is inert and soluble or dispersible therein, can be utilized in practicing this invention. These solvents include lower alkanols having from 1 to 4 carbon atoms, lower alkyl esters, e.g., butyl acetate, ethyl acetate, amides such as dimethylformamide and water. In most situations, though, the solvents that can be used are severely limited. Some, although effective for reducing polymer deposition, may cause polymer degradation or discoloration. Dimethylformamide is an example. For these reasons, it is necessary to determine the effect that any residual solvent may have on the finished polymer in terms of degradation or discoloration. As mentioned, the solvent should be substantially inert to the alkali metal hydroxide so that it does not substantially reduce the basicity of the solution. For example, if acetic acid or other carboxylic acid were used as the solvent, a salt would be formed and this would reduce the benefits that could be obtained. The preferred solvent for use in treating the interior reactor surfaces is water. It provides desirable results without affecting product quality or effecting polymer degradation or polymer discoloration. Of the lower alkanols, methanol and ethanol are preferred although these solvents are not as desirable as water.

In some cases it is preferred to add a small amount of a conventional wetting agent, e.g., surfactant, or emulsifier which is soluble in the alkali metal hydroxide solution to the treating solution. The wetting agent or surfactant enhances the coverage of the reactor surface particularly where there is some polymer deposit on the reactor walls. The decision to use a surfactant generally is based on viewing the coating of the surface and ascertaining the coverage being effected. If the coverage is small and the treating solution appears to "run off" the polymer surface, then surfactant should be used. Typically, surfactant concentrations from 0.005-0.5% based on the weight of the solution or as recommended by manufacturers are used. Conventional surfactants include quaternary ammonium aryl halides.

In order to reduce the wall fouling, the alkali metal hydroxide solution is applied to the internal reactor surface, including agitator blades, agitator shaft, baffles, and other elements therein in sufficient amount to wet the interior surfaces prior to charging the recipe. The application of the alkali metal hydroxide solution can be conducted in many ways, but the simplest and fastest is to spray the solution directly onto the reactor surfaces. In addition, it normally results in the usage of less material. Alternatively, the reactor can be charged with the alkali metal hydroxide solution and stirred by means of the reactor agitator and then drained. After the internal reactor surfaces have been contacted with the alkali metal hydroxide solution, the excess solution is drained from the reactor. The reactor then in a broad sense is ready to be charged with the vinyl chloride polymerization recipe.

Although the wetting of the internal surface of the stainless steel reactor with the alkali metal hydroxide treating solution can result in reducing polymer deposition in the suspension polymerization of vinyl chloride, it has been found that superior results are obtained if the solution is "baked" onto the surface of the reactor prior to charging the polymer reaction mixture or recipe. Baking of the solution onto the reactor surface is accomplished by heating the reactor to a temperature of from 40°-100° C., and preferably to about 60°-80° C. for at least 5 minutes, and preferably from about 10-30 minutes. Longer baking cycles, i.e., those longer than 30 minutes are not required and do not seem to result in any significant advantages. However, baking cycles of 10 hours may be used without adverse effect. It is possible to heat the reaction surface simultaneously with the spraying of the alkali metal hydroxide onto the reactor surface and to terminate heating after spraying. The better plan is to heat for a few minutes after spraying.

The alkali metal hydroxide treatment is most effective in those conventional vinyl chloride recipe polymerizations where the initial pH of the polymerization is at or above 6.0 and preferably above 7.8. When the initial pH falls below about 7.0 and preferably about 7.8, the recipe acidity may neutralize a substantial proportion of the residual alkali metal hydroxide at the reactor surface and reduce its ability to reduce reactor fouling.

With respect to initial pH, this means that the pH of the system itself is above 6.0, and preferably 7.0 to 7.8. Much of the basicity will come from the alkali metal hydroxide remaining in the reactor rather than because of alkaline materials being present in the system. This pH limitation is intended to avoid vinyl chloride recipes which incorporate acids or acidic buffers, e.g., phosphoric acid or phosphates to reduce the pH to a value below about 6.0 and even as low as 4.5. In those cases the buffers react with the alkali metal hydroxide and reduced its effectiveness.

The vinyl chloride recipes which are suspension-polymerized to form a homopolymer or copolymer generally contain water in an amount to provide from about 35-65% solids, from about 0.05%-1.5% a suspending agent, e.g., carboxymethyl cellulose, hydroxyethyl cellulose, and from about 0.01-0.5% of a monomer soluble polymerization initiator, e.g., azo bisvaleronitrile, t-butyl perneodecanoates, t-butyl peroxypivalate, lauryl peroxide, etc. Other monomers copolymerizable with vinyl chloride can be added, and these include vinyl acetate, butyl acrylate, ethylene, propylene, diethyl fumarate, and diethyl maleate. Of these, vinyl acetate in an amount of from 5-20% by weight of the polymer formed is preferred. However, it has been found that the best results are obtained with a homopolymer system.

The following examples are intended to illustrate preferred embodiments of the invention and are not intended to restrict the scope thereof. The examples also provide the best modes for practicing the invention.

EXAMPLES 1-24

Because of the difficulty in obtaining reproducibility of data in suspension polymerization processes, particularly with respect to reducing wall fouling in the reactor, several laboratory runs were made with identical polymer recipes in similarly equipped reactors. The results were evaluated based on the number of grams polymer retained, exclusive of a loose material, in the reactor after a set number of batches had been conducted. The evaluation was made after several runs as it was known that the rate of polymer deposition increases with increasing polymer deposit on the reactor walls.

The two laboratory reactors used in the evaluation were Chemco MDX-GJ model 1-½ liter 316 stainless steel reactors. The first had an electropolished surface, and the second had a manually polished surface. (The basic difference is in the smoothness of the interior reactor surface, the electropolished surface being much smoother and less susceptible to fouling.) In reactors 1 and 2 the recipes were as follows:

| REACTOR 1 (Electropolished Surface) | |
|---|---|
| Water | 600 grams |
| Vinyl chloride monomer | 300 grams |
| Hydroxypropyl methyl cellulose[1] | 0.27 grams |
| t-butylperoxyneodecanoate[3] | 0.3 ml. |
| Temperature - 59° C. | |
| Agitation Rate - 700 RPM | |
| REACTOR 2 (Manually Polished Surface) | |
| Water | 600 grams |
| Vinyl chloride monomer | 300 grams |
| Hydroxypropyl methyl cellulose[2] | 0.50 grams |
| t-butylperoxyneodecanoate[3] | 0.3 ml. |
| Temperature - 59° C. | |
| Agitation Rate - 700 RPM | |

[1]Hydroxypropyl methyl cellulose having a 2% aqueous solution viscosity of 35 cps. at 20° C. and sold under the trademark Methocel K-35.
[2]Hydroxypropyl methyl cellulose having a 2% aqueous solution viscosity of 50 cps. at 20° C. and sold under the trademark Methocel E-50.
[3]t-butylperoxyneodecanoate sold under the trademark Lupersol-10 (75% in mineral spirits).

Each of the polymer recipes were polymerized to form a vinyl chloride polymer having an inherent viscosity of about 0.92 and the polymerization was terminated when the reaction pressure dropped about 20 psig from the initial pressure. As can be see seen from the recipes, there were no buffers or strongly alkaline materials present except for the residual caustic remaining from the spray. The initial pH of the recipes was above 7.0 in all cases.

In the runs relating to the process of this invention the general method was to wet the reactor surface thoroughly by spraying the walls with the solution designated and then draining the excess from the reactor prior to charging the recipe. In some cases, where indicated, the reactor surfaces were heated or baked prior to charging the recipes. In the laboratory an electric heat gun was applied to the surface of the reactor for a time to dry the surface as evidenced by a whitish appearance. Usually this took about 5 minutes and it was believed the maximum surface temperature reached was about 60°-80° C.

In some cases where a comparison was made with prior art technology minor additions of components, as indicated, were added to the polymer recipe.

Each run was evaluated to determine if the pretreatment had any effect on yield or particle size. A bimodal indication meant that two peaks were noted in a particle size distribution curve using sieve analysis. The number of batches carried out in the reactor and the fouling, i.e., the total grams of material deposited upon the reactor surfaces exclusive of loose material were recorded. Tables 1 and 2 below give the results for reactor 1 and reactor 2, respectively.

TABLE 1

| | | REACTOR 1 | | | | |
|---|---|---|---|---|---|---|
| EXAMPLES | ANTI-FOULING TREATMENT | SURFACTANT LEVEL K-35 ml. | YIELD | BIMODAL | BATCHES | TOTAL FOULING (grams) |
| 1 | Control no Treatment | 0.27 | 78 | No | | |
| | | | 80 | No | 3 | 26.6 |
| | | | 77 | No | | |
| 2 | Control no Treatment | 0.27 | 79 | Yes | | |
| | | | 79 | No | 3 | 28.0 |
| | | | 73 | Yes | | |
| 3 | Oxalic acid 0.1 gm. in recipe (prior art) pH <7.0 | 0.27 | 82 | Yes | | |
| | | | 76 | Yes | 3 | 35.9 |
| | | | 71 | Yes | | |
| 4 | 30% KOH in water spray, dried with heat gun for 2 min. | 0.27 | 75 | No | | |
| | | | 88 | No | 3 | 4.7 |
| | | | 74 | No | | |
| 5 | 30% NaOH in water spray, dried with heat gun for 5 min. | 0.27 | 80 | No | | |
| | | | 81 | No | 3 | 1.0 |
| | | | 81 | No | | |
| 6 | 30% NaOH in water, under nitrogen purge, wet surface | 0.27 | 76 | No | | |
| | | | 72 | No | 3 | 11.0 |
| | | | 76 | No | | |
| 7 | 5% NaOH spray, dried heat gun 5 min. | 0.27 | 80 | No | 2 | 10.4 |
| 8 | 30% NaOH spray, dried with heat gun at 80° for 5 min., 0.04 g. disodium calcium ethyldiamine tetracetic acid in recipe. | 0.27 | 76 | No | | |
| | | | 75 | No | 3 | 21.0 |
| | | | 78 | No | | |
| 9 | Control batch plus 0.04 g. disodium calcium ethylenediamine tetracetic acid in recipe. | 0.27 | 79 | Yes | | |
| | | | 77 | No | 3 | 25.8 |
| | | | 73 | Yes | | |
| 10 | 30% NaOH in methanol, air dried at room temp. 1 hr. | 0.27 | 79 | No | | |
| | | | 76 | No | 3 | 3.3 |
| 11 | 30% NH4OH in water heat for 30 minutes 80° C. | 0.27 | 79 | Yes | | |
| | | | 77 | Yes | 2 | 14.3 |
| 12 | 0.06 g. zinc chloride in recipe (prior art) | 0.27 | 80 | No | 2 | 14.0 |
| | | | 77 | No | | |
| 13 | 30% KOH in methanol, heated at 70° C. for 30 min. | 0.27 | 79 | No | | |
| | | | 79 | No | 3 | 0.00 |
| | | | 79 | No | | |

TABLE 2

| EXAMPLES | ANTI-FOULING TREATMENT | REACTOR 2 SURFACTANT g. | YIELD | BIMODAL | BATCHES | FOULING (gm.) |
|---|---|---|---|---|---|---|
| 14 | Control | 0.5 | 78 / 70 | Yes / Yes | 2 | 55.3 |
| 15 | Control | 0.5 | 67 / 69 | No / No | 2 | 52.4 |
| 16 | 30% NaOH in water Dry electric heat gun 5 minutes | 0.5 | 79 / 82 | No / No | 2 | 5.5 |
| 17 | 30% KOH in methanol, heated at 70° for 30 min. | 0.5 | 83 / 80 | Yes / Yes | 2 | 1.3 |
| 18 | 20% NaOH, baked at 70° C. for 20 min. | 0.5 | 77 | Yes | 2 | 3.4 |
| 19 | treated with 10% NaOH in water containing 0.1% Hyamine 2389[a]-dried with heat gun at 80° C. | 0.5 | 79 / 78 | No / No | 2 | 3.1 |

[a]Hyamine 2389 is a surfactant consisting of a mixture of methyl dodecylbenzyl trimethyl ammonium chloride and methyl dodecylxylene bis(trimethyl ammonium chloride)

The results in Tables 1 and 2 show that the alkali metal hydroxide treatment is effective for reducing wall fouling in suspension polymerization as compared to the control batches. The results also show that, heating the reactor surface prior to charging the recipe to the reactor significantly reduces the wall fouling even more than the alkali metal hydroxide treatment alone.

In comparing the results obtained by using the alkali metal hydroxide spray with commercially available methods, e.g., the use of disodium calcium ethylene diamine tetracetic acid, the results appear to be at least as good, if not better, in most instances without regard for the simplified and more inexpensive method for reactor treatment. One surprising feature is that the disodium monocalcium salt of ethylenediamine tetra-acetic acid (EDTA) retarded the ability of the NaOH to reduce the wall fouling. The results were surprising because the compound, when used alone, allegedly is effective for reducing wall fouling in vinyl chloride polymerization.

EXAMPLE 25

The following plant operation was conducted to determine whether the laboratory experience could be translated into a commercial operation. The recipe used was essentially the same as in Example 1 with polyvinyl chloride homopolymer being produced. In the test case, the treating solution was formulated by mixing 499 gallons of a solution of 23% caustic soda in water and one gallon of Hyamine 2389, i.e., methyl dodecylbenzyl trimethyl ammonium chloride and methyl dodecyl xylene bis(trimethyl ammonium chloride). The Hyamine surfactant was added to enhance the wetting properties of the caustic soda solution in the reactor.

The stainless steel reactor was sprayed with the caustic soda solution for about 5 minutes to insure adequate coverage and then allowed to drain. During the spray operation, steam was applied to the jacket for heating the surface. Initially, steam was left in the jacket during draining, but that procedure was dropped after about 3 to 4 batches. After draining, the reactor was rinsed with water and the excess water removed. Approximately 15 batches were polymerized in the reactor, and reduced wall fouling was observed.

Reactors used for polymerization without pretreatment, normally produce about 10 to 12 batches prior to cleaning. Although the pretreatment method showed that it could reduce wall fouling in commercial stainless steel reactors there was an insufficient basis for determining whether it was superior to many other commercially available processes. However, it had decided advantages in terms of its ease of application and expense.

EXAMPLE 26

A vinyl chloride-vinyl acetate copolymer was prepared in Reactor #1 by the method in Example 1 by polymerizing the following recipe:

| | |
|---|---|
| Water | 600 grams |
| Vinyl Acetate | 64 grams |
| Vinyl Chloride | 311 grams |
| Sodium Bicarbonate | 0.18 grams |
| Suspending Agent | 0.45 grams |
| Trichloroethylene | 2.56 grams |
| azo bis-isovaleronitrile | 0.30 grams |
| Polymerization Temp. | 73° C. |
| Agitation; 500 rpm | 0.15 |

The fouling results after 3 runs of a control batch were 10.7 grams. When the reactor was pretreated with a 37% NaOH in water spray and the reactor dried with a heat gun at a temperature of about 80° C., the fouling was 6.4 grams. Although these results show that fouling is not as severe with copolymerization in this type of recipe it also shows that the caustic soda pretreatment is effective to reduce wall fouling.

What is claimed is:

1. In a suspension polymerication process wherein a recipe comprising vinyl chloride or a mixture of vinyl chloride and another vinyl monomer, water, a suspension agent, and a monomer soluble polymerization catalyst is charged to a stainless steel reactor at an intial pH above 6.0 and subsequently polymerized at an elevated temperature to produce a vinyl chloride containing polymer, the improvement for reducing wall fouling in said stainless steel reactor, which comprises:
   wetting the internal reactor surface with a solution comprising from about 10–50% by weight of an alkali metal hydroxide; and
   heating the wet reactor surface to a temperature from 40°–100° C. for a period of at least 5 minutes prior to charging the recipe to the reactor.

2. The process of claim 1 wherein said alkali metal in said hydroxide is selected from the group consisting of sodium, potassium, and lithium.

3. The process of claim 2 where in said alkali metal hydroxide is selected from the group of sodium and potassium hydroxide and said solvent is water.

4. The process of claim 1 wherein said solvent is selected from the group consisting of a lower alkanol having from 1–4 carbon atoms and water.

5. The process of claim 3 wherein from 0.005 to 0.5% of a surfactant is included in said solution.

* * * * *

UNITED STATES PATENT AND TRADEMARK OFFICE
CERTIFICATE OF CORRECTION

PATENT NO. : 4,359,560

DATED : 16 November 1982

INVENTOR(S) : Bernard D. Bauman

It is certified that error appears in the above-identified patent and that said Letters Patent is hereby corrected as shown below:

In the Abstract, Line 5
    Delete "parts" and substitute therefor --percent--.

Column 2, Line 15
    Delete "parts" and substitute therefor --percent--.

Column 2, Line 33
    After "at least", insert --as good--.

Column 4, Line 57
    After "invention", add --It can be noted that the examples demonstrate effective anti-wall fouling treatment with solutions which are free of polyaromatic amines of the type disclosed in U.S. 4,024,301 referenced above.--

Signed and Sealed this

Twenty-eighth Day of June 1983

[SEAL]

Attest:

GERALD J. MOSSINGHOFF

Attesting Officer     Commissioner of Patents and Trademarks